(12) United States Patent
Taniguchi et al.

(10) Patent No.: US 7,883,101 B2
(45) Date of Patent: Feb. 8, 2011

(54) BODY FRAME OF MOTORCYCLE

(75) Inventors: Masayuki Taniguchi, Saitama (JP);
Yuzuru Ishikawa, Saitama (JP); Kenji Hasegawa, Saitama (JP); Koji Shimokawa, Saitama (JP); Shunichi Nakajima, Saitama (JP); Naoshi Iizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 11/365,859

(22) Filed: Mar. 2, 2006

(65) Prior Publication Data

US 2006/0196713 A1    Sep. 7, 2006

(30) Foreign Application Priority Data

Mar. 2, 2005    (JP) .............................. 2005-057030

(51) Int. Cl.
*B62K 11/06* (2006.01)
*B62K 11/02* (2006.01)
*B62K 19/02* (2006.01)

(52) U.S. Cl. ................................. 280/281.1
(58) Field of Classification Search ............... 180/219, 180/227; 280/274, 281.1, 284
See application file for complete search history.

(56) References Cited

U.S. PATENT DOCUMENTS

| | | | | |
|---|---|---|---|---|
| 4,139,072 | A | * | 2/1979 | Dawson ...................... 180/312 |
| 4,449,602 | A | * | 5/1984 | Dittmann, Jr. ............... 180/215 |
| 4,585,247 | A | * | 4/1986 | Takada ..................... 280/281.1 |
| 4,706,774 | A | * | 11/1987 | Tsuboi ........................ 180/227 |
| 4,765,431 | A | * | 8/1988 | Yoshioka .................... 180/219 |
| 5,011,459 | A | | 4/1991 | Van De Vel |
| 5,022,456 | A | | 6/1991 | Kanzawa et al. |
| 5,375,677 | A | * | 12/1994 | Yamagiwa et al. .......... 180/219 |
| 5,480,001 | A | * | 1/1996 | Hara .......................... 180/227 |
| 5,845,728 | A | * | 12/1998 | Itoh et al. ................... 180/219 |

(Continued)

FOREIGN PATENT DOCUMENTS

JP    02-251352 A    10/1990

(Continued)

OTHER PUBLICATIONS

Yamaguchi, et al., "Lightweight Motorcycle Adopts Diecase Aluminum Frame," Automotive Engineering, Society of Automotive Engineers, vol. 97, No. 2, Feb. 1, 1989, p. 173.

*Primary Examiner*—Lesley Morris
*Assistant Examiner*—Daniel Yeagley
(74) *Attorney, Agent, or Firm*—Birch, Stewart, Kolasch & Birch, LLP

(57) ABSTRACT

In a motorcycle, a head pipe is provided with one main frame part that extends rearwardly from the head pipe and a rear frame that extends substantially downwardly from the rear of the main frame part. A pivot is pierced in a pivot support part provided to the rear frame with a swing arm being attached to the pivot so that the swing arm can be vertically swung and a rear shock absorber unit is positioned between the swing arm and the side of the body frame. The main frame is cast in an aluminum alloy and the rear frame on the upside and the downside of the pivot supporting part projects on both sides of a vehicle from the pivot supporting part to attach right and left brackets for supporting both ends of the pivot.

20 Claims, 6 Drawing Sheets

U.S. PATENT DOCUMENTS

| | | | |
|---|---|---|---|
| 6,371,236 B1 * | 4/2002 | Fukunaga | 180/219 |
| 6,668,960 B1 * | 12/2003 | Parker | 180/227 |
| 2002/0020985 A1 | 2/2002 | Nakagawa | |
| 2006/0283649 A1 * | 12/2006 | Nakanishi | 180/227 |

FOREIGN PATENT DOCUMENTS

| | | |
|---|---|---|
| JP | 06-179387 A | 6/1994 |
| JP | 09-086468 A | 3/1997 |
| JP | 2000-085668 A | 3/2000 |
| JP | 2001-122177 A | 5/2001 |
| JP | 3436330 B2 | 6/2003 |
| WO | WO-01/89916 A1 | 11/2001 |

\* cited by examiner (a)　　　　　　　(b)

(c)

BODY FRAME OF MOTORCYCLE

CROSS-REFERENCE TO RELATED APPLICATIONS

The present application claims priority under 35 USC 119 to Japanese Patent Application No. 2005-057030 filed on Mar. 2, 2005 the entire contents of which are hereby incorporated by reference.

FIELD OF THE INVENTION

The present invention relates to the improvement of a body frame of a motorcycle.

DESCRIPTION OF BACKGROUND ART

A body frame for a conventional type motorcycle that includes a pivot part for supporting a swing arm that is provided on the body frame is known, for example, as set forth in JP No. 3436330.

FIGS. 2 to 4 of JP No. 3436330 will be described below.

A body frame 1 is provided with a main pipe 3 extending rearwardly and downwardly 1y from a head pipe 2 with a seat rail 4 extending rearwardly from the rear upside of the main pipe 3. A sub-pipe 7 is laid between a lower part of the main pipe 3 and the seat rail 4 with a pair of left and right reinforcements 13, 13 being attached to the rear and extending downwardly 1y of the main pipe 3. A cylindrical pivot part 8a is attached so that the main pipe 3 and the reinforcements 13, 13 are pierced with a rear shock absorber receiver 11 being attached to a connection of the main pipe 3 and the seat rail 4.

The above-mentioned reinforcements 13, 13 are welded to the main pipe 3, with the pivot part 8a being welded to the main pipe 3 and the reinforcements 13, 13 and the rear shock absorber receiver 11 also being welded to the main pipe 3 and the seat rail 4. The welded locations are increased and time for welding is also increases. In addition, as many parts are required, the weight and the cost is increased. Therefore, an enhancement in productivity, a lightening of the body frame and a reduction in the cost are desired.

SUMMARY AND OBJECTS OF THE INVENTION

It is an object of an embodiment of the invention to enhance the productivity of a body frame, to lighten the body frame and to reduce the cost by improving the body frame of a motorcycle.

An embodiment of the present invention provides a motorcycle wherein a head pipe is provided on a front end with one main frame extending rearwardly from the head pipe and a pivot frame extending substantially downwardly from the rear of the main frame that are provided to a main part of a body frame. A pivot pierces a pivot supporting part provided to the pivot frame with a swing arm for supporting a rear wheel being attached to the pivot so that the swing arm can be vertically swung and a shock absorber is positioned between the swing arm and the side of the body frame. The main part of the body frame is cast in an aluminum alloy and the pivot frame on the upside and on the downside of the pivot supporting part projects on both sides of the vehicle from the pivot supporting part to attach left and right brackets for supporting both ends of the pivot.

The pivot frame on the upside and on the downside of the pivot supporting part projects on both sides of the vehicle from the pivot supporting part to attach the left and right brackets for supporting both ends of the pivot to the pivot frame. Left and right arms of the swing arm are arranged on both sides of the pivot supporting part with the swing arm being supported by the pivot attached to the pivot supporting part and the left and right brackets.

The above-mentioned pivot supporting part and projections that project on the upside and on the downside of the pivot supporting part are integrated by casting.

An embodiment of the present invention provides standing walls that extend rearwardly for covering the left and the right of the shock absorber unit that is mounted to at least one of the rear of the main frame and the rear of the pivot frame.

The main frame or/and the pivot frame and the standing walls provided to at least one of the rear of the main frame and the rear of the pivot frame are integrated by casting.

An embodiment of the present invention provides recessed portions open in the right and left directions, the pivot supporting part, an upper bracket mounting part and a lower bracket mounting part, respectively, project sideways and are integrated by casting the pivot frame in a mold which can be split sideways.

In view of the fact that the recessed portion open sideways, the pivot supporting part, the upper bracket mounting part and the lower bracket mounting part, respectively, project in the right and left directions and are integrated in a mold which can be split in the right and left, the recessed portion, the pivot supporting part, the upper bracket mounting part and the lower bracket mounting part can be easily formed.

An embodiment of the present invention provides the main part of the body frame where the upside and the downside of the pivot supporting part in the pivot frame project on both sides of the vehicle from the pivot supporting part with the left and right arms of the swing arm being arranged between the pivot supporting part and each bracket. The swing arm is supported by both the pivot supporting part and the left and right brackets via the pivot that can be easily integrated by casting. Thus, no welded part around a pivot, as in a conventional type, is required. Therefore, the number of parts can be reduced, the productivity of the body frame can be enhanced, the body frame is lightened, and the cost can be reduced.

An embodiment of the present invention provides standing walls that are provided to at least one of the rear of the main frame and the rear of the pivot frame, the standing walls can be easily formed by casting without welding separate parts. Thus, the strength and the rigidity of the body frame can be easily secured by the standing walls.

An embodiment of the present invention provides the recessed portion open sideways, the pivot supporting part, the upper bracket mounting part and the lower bracket mounting part, respectively, that project sideways and are integrated in the mold which can be split sideways. Thus, the recessed portion, the pivot supporting part, the upper bracket mounting part and the lower bracket mounting part can be easily formed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, a best embodiment for embodying the invention will be described below.

Figure 1:
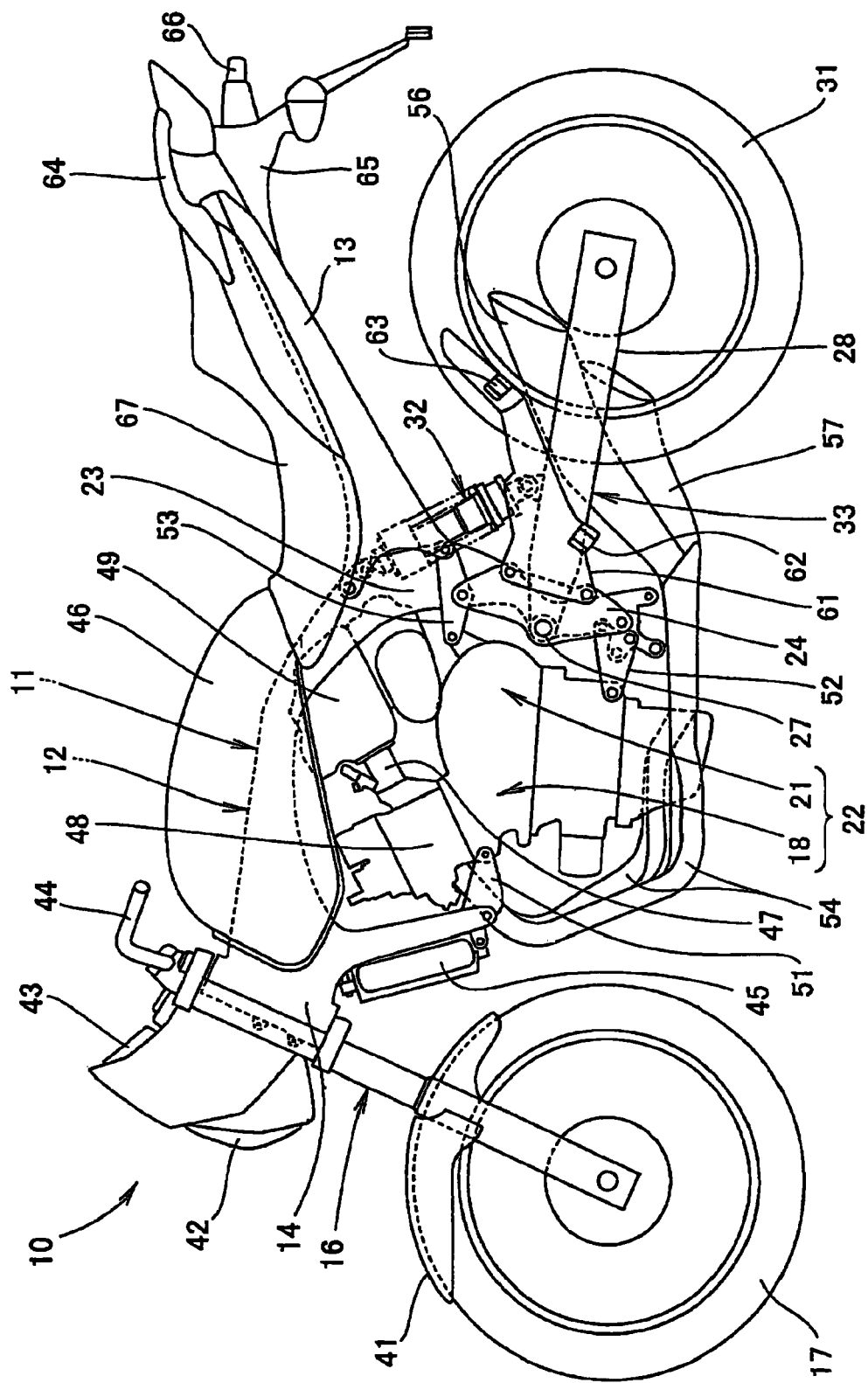
FIG. 1 is a side view showing a motorcycle adopting a body frame according to the invention.

FIG. 1 is a side view showing a motorcycle 10 having a body frame 11 according to the invention. The body frame 11 is configured by a main frame 12 on the front side and a pair of left and right seat rails 13, 13 (only 13 on this side is shown) extending rearwardly and diagonally upwardly from a rear upside of the main frame 12. A front fork 16 is attached to a head pipe 14 that is provided to the front end of the main frame 12 for steering the front fork. A front wheel 17 is attached to the lower end of the front fork 16 with a power unit 22 including an engine 18 and a transmission 21 being supported by a lower part of the front and a lower part of the rear of the main frame 12. A pivot 27 is attached to a rear frame 23 provided to the rear of the main frame 12 and a pair of left and right brackets 24, 26 (only 24 on this side is shown) is attached to both sides of the rear frame 23. A swing arm 28 is attached to the pivot 27 so that the swing arm can be vertically swung with a rear wheel 31 being attached to the rear end of the swing arm 28 and a rear shock absorber 32 being positioned between the upside of the swing arm 28 and the rear upside of the main frame 12.

The swing arm 28 and the rear shock absorber 32 form a suspension 33 for a rear wheel for suspending the rear wheel 31.

A front fender 41 is provided for covering the upside of the front wheel 17. A headlamp 42 is provided together with a meter 43 and a handlebar 44. A radiator 45 is provided with a fuel tank 46 being attached to the upside of the main frame 12. A throttle body 47 is attached to the rear of a cylinder head 48 of the engine 18 with an air cleaner 49 being connected to the throttle body 47. Brackets 51, 52 are provided for supporting the power unit 22. A rear supporting part 53 is provided to the rear frame 23 to support the power unit 22. An exhaust pipe 54 extends rearwardly from the front of the cylinder head 48 through the downside of the engine 18 with a first muffler 56 and a second muffler 57 being connected to plural exhaust pipes 54.

A pair of left and right step supporting stays 61, 61 (only 61 on this side is shown) are attached to brackets 24, 26. A pair of left and right steps 62, 62 (only 62 on this side is shown) for a rider are attached to the step supporting stays 61, 61. A pair of left and right steps for a passenger are attached to the step supporting stays 63, 63 (only 63 on this side is shown). A grab rail 64 is provided together with a rear fender 65 for covering the upside of the rear wheel 31. In addition, a tail lamp 66 is provided together with a seat 67 that is attached onto the seat rails 13, 13.

Figure 2:
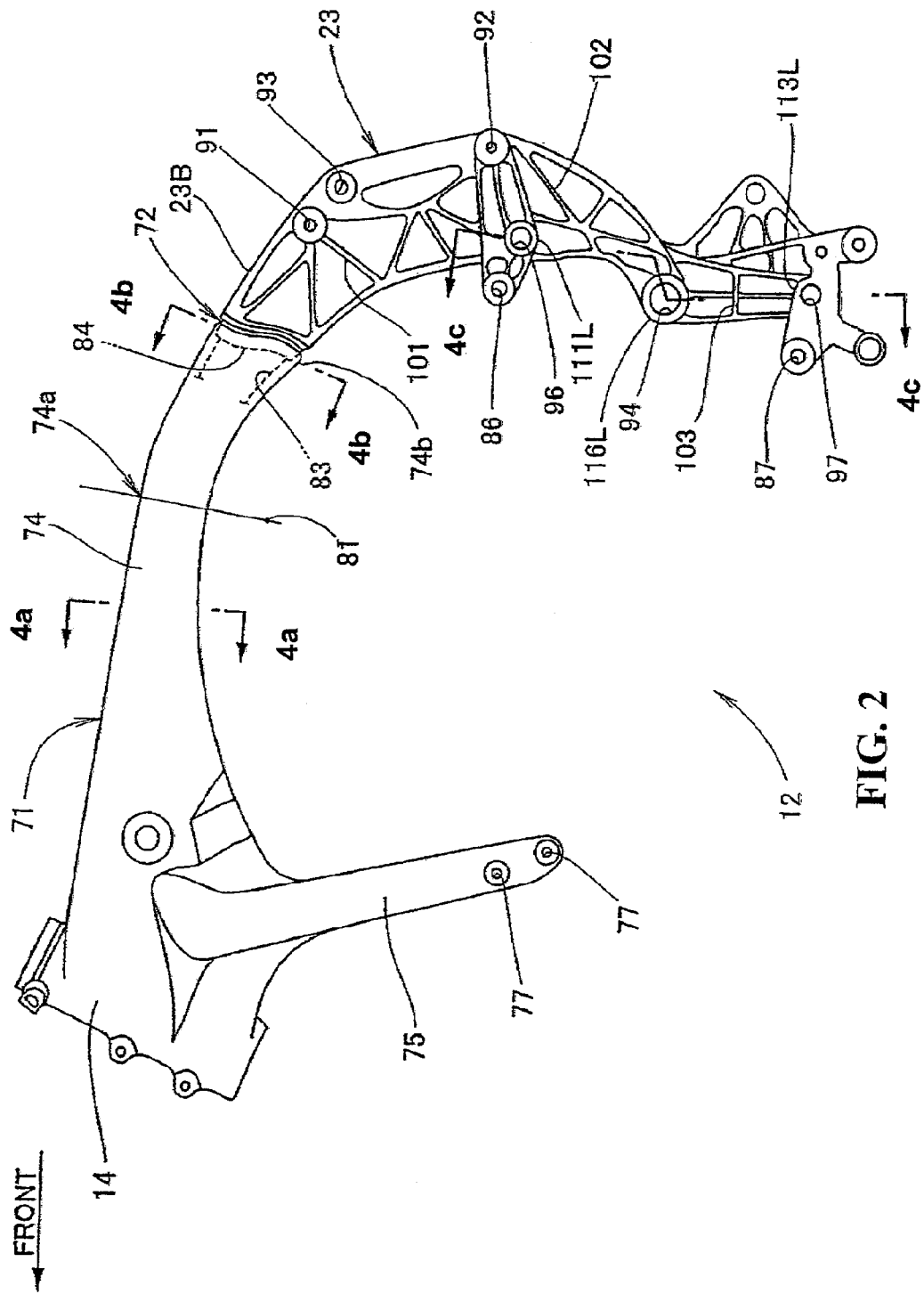
FIG. 2 is a side view showing a main frame according to the invention.

FIG. 2 is a side view showing the main frame according to the invention (an arrow FRONT in FIG. 2 shows a forward direction of the vehicle) and the main frame 12 is a member cast in an aluminum alloy and configured by two front and rear parts which are a front frame 71 on the front side and the rear frame 23 connected to the rear end of the front frame 71 by welding. A connection 72 is provided for the front frame 71 and the rear frame 23.

The front frame 71 is a member formed to be hollow by inserting a core in casting and formed by integrating the head pipe 14, one main frame part 74 extending rearwardly from the head pipe 14 and a pair of left and right front supporting parts 75, 76 (only 75 on this side is shown) extending diagonally downwardly on the side and diagonally downwardly on the rear side from a lower part of the front of the main frame part 74 so as to support the front of the engine 18 (see FIG. 1). Engine supporting holes 77, 77 are provided adjacent to the ends of the front supporting parts 75, 76 so as to support of the front of the engine 18 (see FIG. 1).

The main frame part 74 is provided with a small cross-sectional part 74a the cross-sectional area of which is the smallest (a straight line passing the small cross-sectional part 74a shall be 81) in the rear and the cross-sectional area (that is, the cross-sectional area of the connection 72) of a front side connecting part 74b provided to the rear end is made larger than the cross-sectional area of the small cross-sectional part 74a.

A force which tries to deform the main frame 12 is applied to the main frame 12 built in the vehicle from the head pipe 14 via the front wheel and the front fork or from the rear frame 23 via the rear wheel, the swing arm and the pivot while the vehicle is being operated.

For example, in braking, rearwardly a force acts on the head pipe 14 from the side of the front wheel and the whole main frame 12 is deformed so that distance between the axles of the front and the rear wheel, that is, a wheel base is shorter.

When a throttle is opened for acceleration, a forward force acts on the rear frame 23 by the driving force of the rear wheel and the whole main frame 12 is deformed so that the wheel base is shorter.

In the above-mentioned case, a large stress is caused in the small cross-sectional part 74a. However, as the cross-sectional area of the connection 72 is larger than that of the small cross-sectional part 74a, stress caused in the connection 72 is smaller than that in the small cross-sectional part 74a.

The reason why the connection 72 is provided at the back of the small cross-sectional part 74a in the rear of the vehicle is that in case the connection 72 is provided in front of the small cross-sectional part 74a in the front of the vehicle, excess stress is caused in the connection 72 because a maximum input from the side of the head pipe 14 (for example, input in full braking) is larger than a maximum input from the side of the rear frame 23.

The reason is also that the connection 72 is a position in which the main frame is easily divided into one main frame part 74 and the rear frame 23 for supporting each part of the body.

The rear frame 23 is provided with a rear side connecting part 84 that projects to fit it into a hollow part 83 of the front side connecting part 74b of the front frame 71 with a pair of left and right power unit mounting holes 86, 86 (only 86 on this side is shown) and a pair of left and right power unit mounting holes 87, 87 (only 87 on this side is shown), respectively, for mounting the rear of the power unit 22 (see FIG. 1).

Seat rail mounting holes 91, 91 (only 91 on this side is shown) and seat rail mounting holes 92, 92 (only 92 on this side is shown), respectively, are provided for mounting the seat rails 13, 13 (see FIG. 1). A pair of left and right shock absorber upper part mounting holes 93, 93 (only 93 on this side is shown) is provided for mounting one end of the rear shock absorber 32 (see FIG. 1). A pivot insertion hole 94 is provided for inserting the pivot 27 (see FIG. 1). A pair of left and right bracket mounting holes 96, 96 (only 96 on this side is shown) and bracket mounting holes 97, 97 (only 97 on this side is shown), respectively, are provided for mounting the bracket 24, 26 (see FIG. 1). On the side, a plurality of ribs, for example, a pair of left and right ribs 101 to 103 (only 101 to 103 on this side are shown) are provided.

Figure 3:
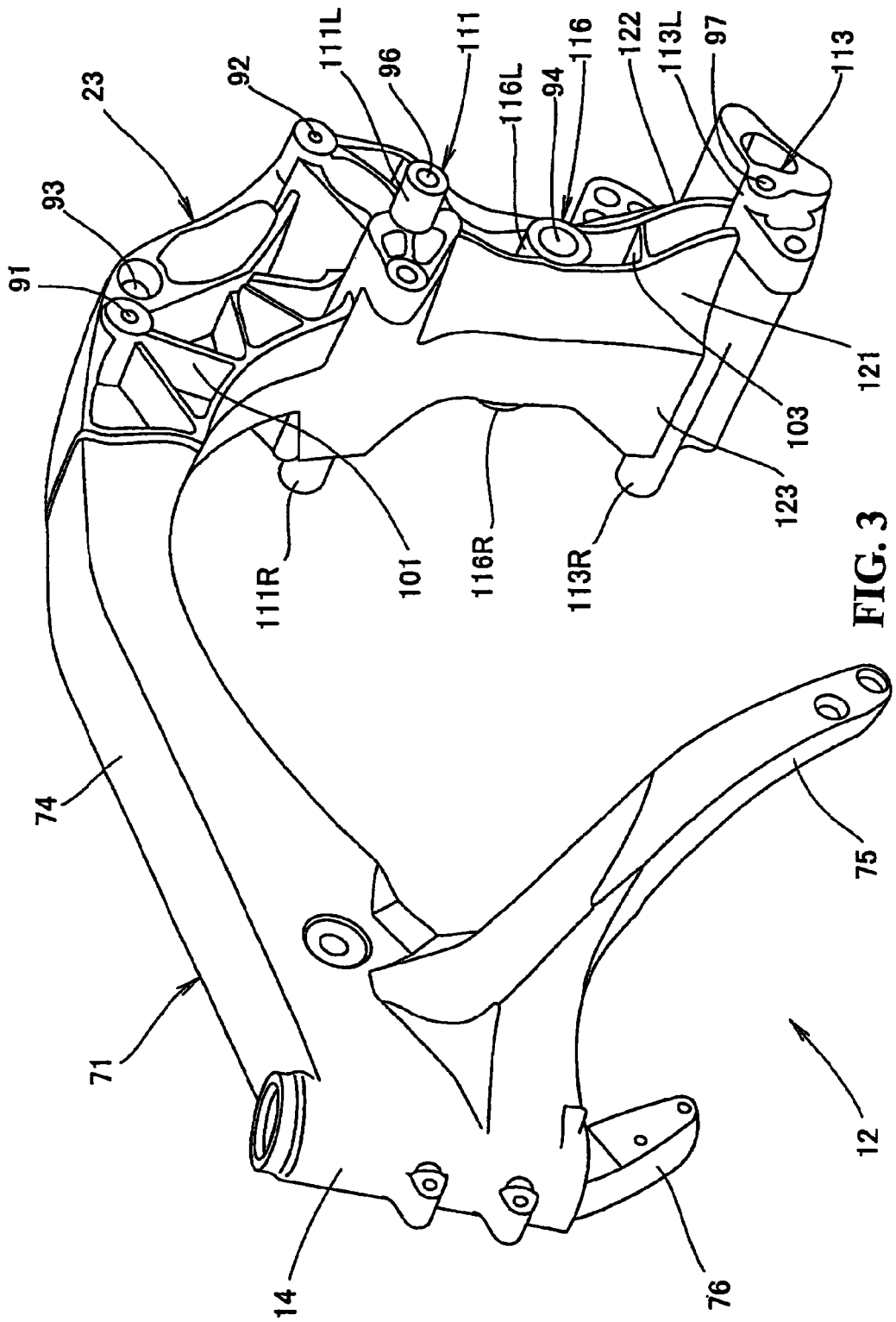
FIG. 3 is a perspective view showing the main frame according to the invention.

FIG. 3 is a perspective view illustrating the main frame according to an embodiment of the invention. The main frame 12 is formed by connecting the rear frame that is integrated in casting to the main frame part 74 of the front frame 71 that is integrated in casting.

One main frame part 74 is substantially linearly extending rearwardly and the front supporting parts 75, 76 which function as an engine hanger extends substantially downwardly on the left and on the right from the main frame part 74. The main frame part 74 and the front supporting parts 75, 76 are hollow.

An upper bracket mounting part 111 (configured by a pair of left upper mounting part 111L and right upper mounting part 111R) in which the bracket mounting hole 96 is made and a lower bracket mounting part 113 (configured by a pair of left lower mounting part 113L and right lower mounting part 113R) in which the bracket mounting hole 97 is made, respectively, of the rear frame 23 project sideways from a pivot supporting part 116 (configured by a pair of left pivot supporting part 116L and right pivot supporting part 116R) in which the pivot insertion hole 94 is made.

A left reinforcement wall 121, 122 is provided for coupling the left upper mounting part 111L, the left pivot supporting part 116L and the left lower mounting part 113L. A right reinforcement wall 123, 124 (only 123 is shown) is provided for coupling the right upper mounting part 111R, the right pivot supporting part 116R and the right lower mounting part 113R.

Figure 4:
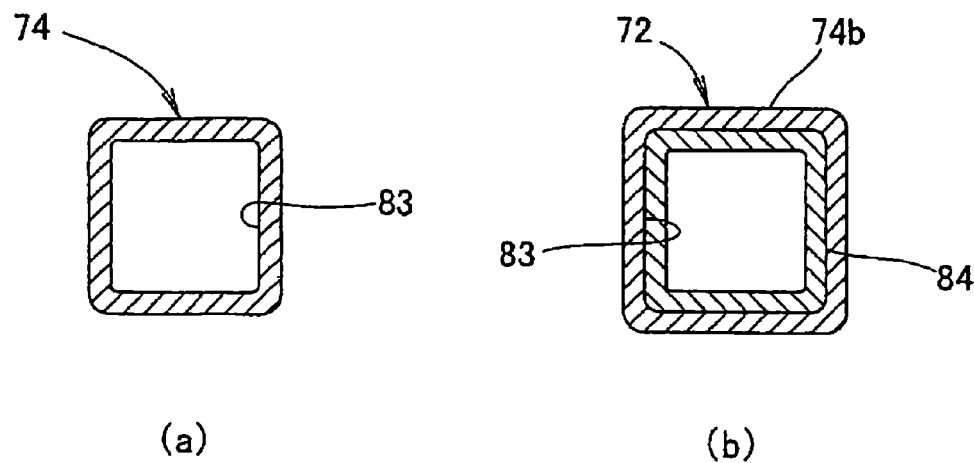
FIGS. 4(a) to 4(c) are sectional views showing the main frame according to the invention.
Figure 4:
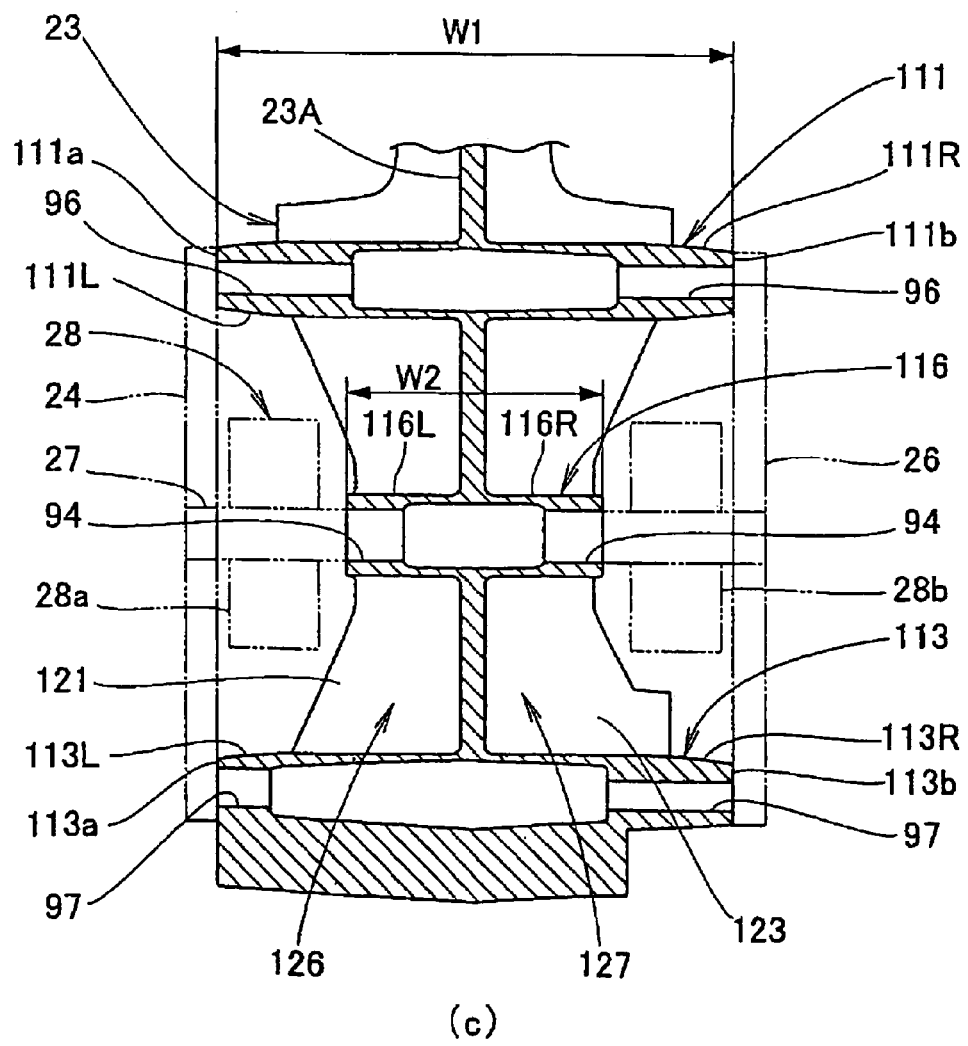

FIGS. 4(*a*) to 4(*c*) are sectional views showing the main frame according to an embodiment of the invention.

FIG. 4(*a*) is a sectional view viewed from directions shown by line 4*a*-4*a* as shown in FIG. 2 and illustrates that the cross section of the main frame part 74 is in the shape of a square pipe.

FIG. 4(*b*) is a sectional view viewed from directions shown by line 4*b*-4*b* as shown in FIG. 2. In the connection 72 of the front frame and the rear frame, the rear side connecting part 84 in the shape of a square pipe is fitted inside the front side connecting part 74*b* in the shape of the square pipe.

FIG. 4(*c*) is a sectional view viewed from directions shown by line 4*c*-4*c* as shown in FIG. 2, and illustrating that a vertical wall 23A extends vertically substantially over the whole length of the center of the rear frame that is provided to the rear frame 23. The left upper mounting part 111L, the right upper mounting part 111R, the left pivot supporting part 116L, the right pivot supporting part 116R, the left lower mounting part 113L and the right lower mounting part 113R extend to the left or the right from the vertical wall 23A. The width W1 of the upper bracket mounting part 111 and the lower bracket mounting part 113 is made longer than the width W2 of the pivot supporting part 116L. A left arm 28*a* and a right arm 28*b* of the swing arm 28 are arranged between each bracket 24, 26 mounted on end faces (an upper-side left end face 111*a*, an upper-side right end face 111*b*, a lower-side left end face 113*a* and a lower-side right end face 113*b*) of the upper bracket mounting part 111 and the lower bracket mounting part 113. The pivot supporting part 116 and the swing arm 28 is supported by the pivot supporting part 116 and the brackets 24, 26 via the pivot 27 by piercing the pivot 27 in the bracket 24, the left arm 28*a*, the pivot supporting part 116, the right arm 28*b* and the bracket 26 so that the swing arm can be swung.

FIG. 4(*c*) also shows that the upper bracket mounting part 111 and the lower bracket mounting part 113 are reinforced by gradually widening the left reinforcement walls 121, 122 (only the left reinforcement wall 121 is shown) and the right reinforcement walls 123, 124 (only the right reinforcement wall 123 is shown) from the side of the pivot supporting part 116 to the side of the upper bracket mounting part 111 and by gradually widening them from the side of the pivot supporting part 116 to the side of the lower bracket mounting part 113. Recessed portions 126, 127 are located on the side of the vehicle with the vertical wall 23A in the center and are formed between the upper bracket mounting part 111 and the lower bracket mounting part 113.

As described above, the rear frame 23 is a member in which the recessed portions 126, 127 open sideways. The upper bracket mounting part 111 and the lower bracket mounting part 113 and the pivot supporting part 116, respectively, project sideways and are integrated by casting in a mold that can be split sideways.

Figure 5:
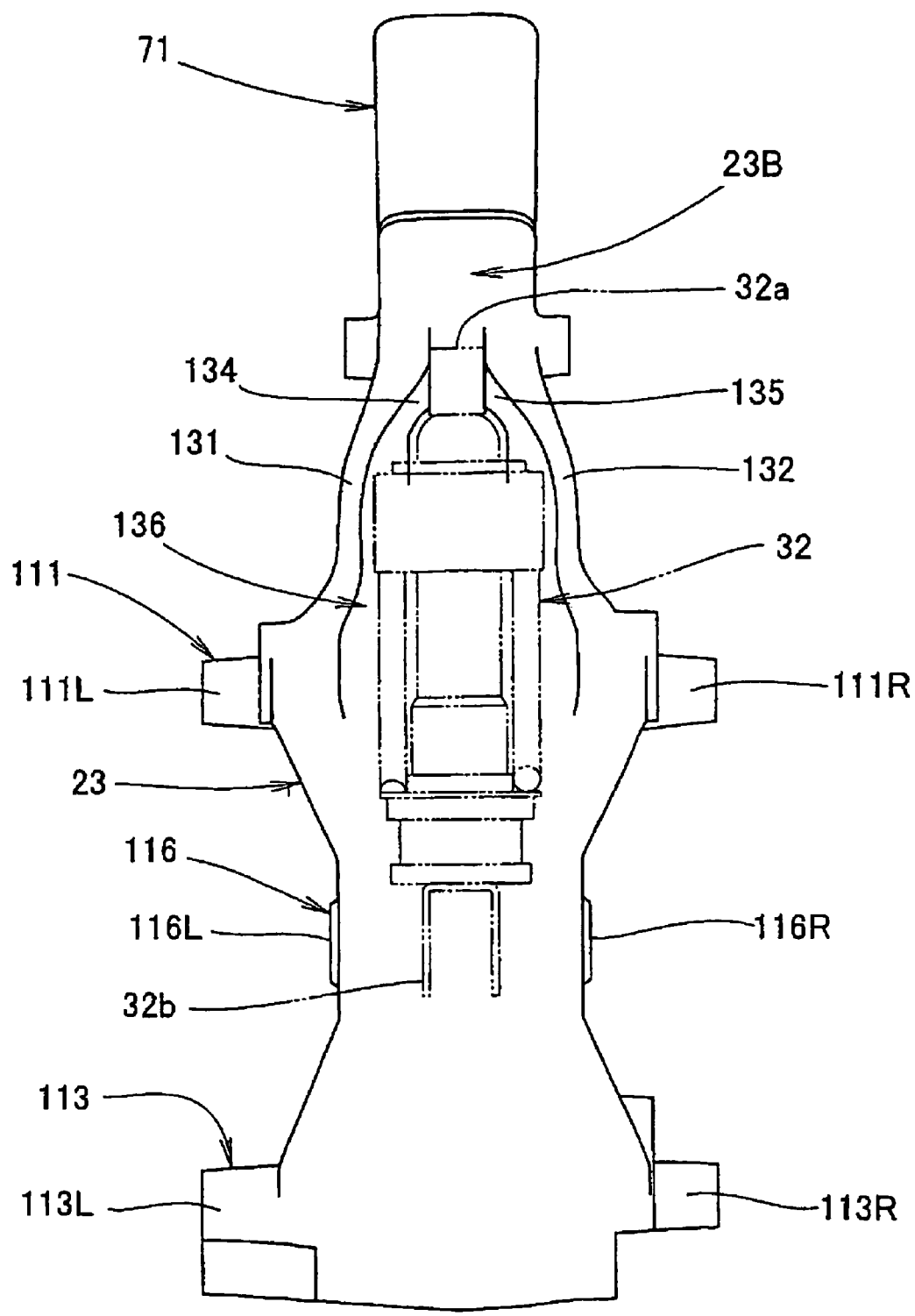
FIG. 5 is a back view showing the main frame according to the invention.

FIG. 5 is a back view illustrating the main frame according to the invention and the rear frame 23 is provided with standing walls 131, 132 that project integrally rearwardly from left and right edges to cover the left and right sides of the rear shock absorber 32 to a rear wall 23B. A shock absorber upper part mounting part 134 (see FIG. 2) is provided in which the shock absorber upper part mounting hole 93 (see FIG. 2) for mounting an upper end 32*a* of the rear shock absorber unit 32 is made. A space 136 is provided between the left and right standing walls 131, 132 for housing a part of the rear shock absorber unit 32 with a lower end 32*b* at which the rear shock absorber unit 32 is attached to the swing arm 28 (see FIG. 1).

Figure 6:
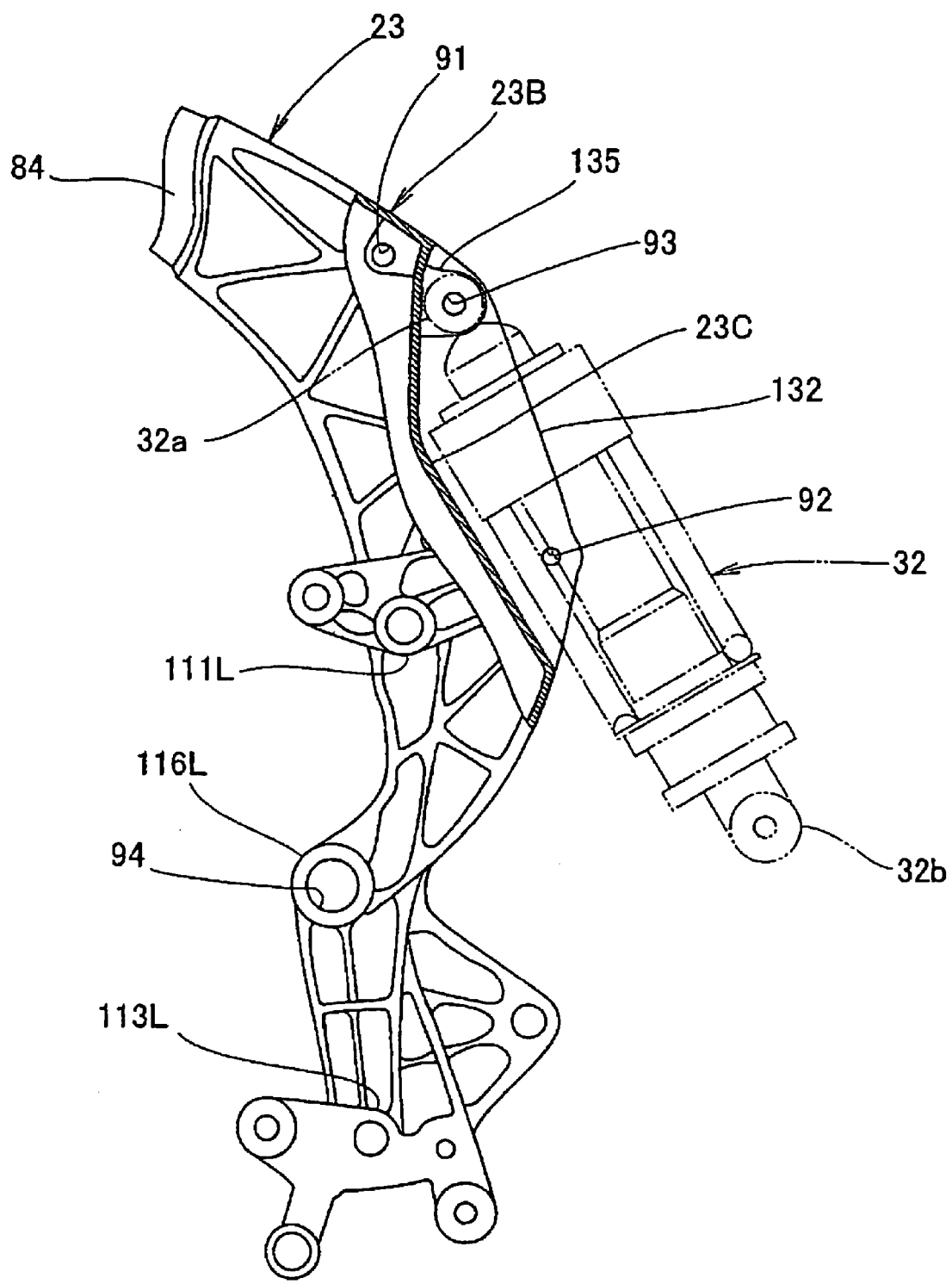
FIG. 6 is a sectional view (a part of which is a side view) showing a state in which a rear shock absorber unit is attached to a rear frame according to the invention.

FIG. 6 is a sectional view (a part of which is a side view) showing a state in which the rear shock absorber unit is attached to the rear frame according to an embodiment of the invention. A rear bottom wall 23C is located between the standing walls 131, 132 (only 132 on the inside is shown) and forming a part of the rear wall 23B is a part substantially along the rear shock absorber unit 32. The shock absorber upper part mounting parts 134, 135 (only 135 is shown) project from the rear bottom wall 23C and the standing walls 131, 132.

The standing walls 131, 132 can be easily formed by casting as compared with a case wherein the standing walls are formed by separate members by welding for example. Thus, the cost can be reduced, and the productivity can be enhanced. As the standing walls 131, 132 also function as a reinforcing rib, the strength and the rigidity of the rear frame 23 can be easily enhanced, compared with a case wherein a separate reinforcement is attached.

As shown in FIGS. 1, 3 and 5, an embodiment of the invention is first based upon the motorcycle 10 where the head pipe 14 is provided to the front end with the main frame part 74 as one main frame extending rearwardly from the head pipe 14. The rear frame 23 acts as a pivot frame extending substantially downwardly from the rear of the main frame part 74 and is provided in the main frame 12 as a main part of the body frame 11. The pivot 27 is pierced in the pivot supporting part 116 provided to the rear frame 23 with the swing arm 28, for supporting the rear wheel 31, being is attached to the pivot 27 so that the swing arm can be vertically swung and the rear shock absorber unit 32 is positioned between the swing arm 28 and the side of the body frame 11. The main frame 12 of the body frame 11 is cast in an aluminum alloy and the rear frame 23 on the upside and the downside of the pivot supporting part 116 projects on both sides of the vehicle from the pivot supporting part 116 to mount the left and right brackets 24, 26 (see FIG. 4(c)) supporting both ends of the pivot 27.

The main frame 12 of the body frame 11 where the upside and the downside of the pivot supporting part 116 in the rear frame 23 project on both sides of the vehicle from the pivot supporting part 116. The left arm 28a and the right arm 28b, as left and right arm parts of the swing arm 28, are arranged between the pivot supporting part 116 and each bracket 24, 26. The swing arm 28 is supported by both the pivot supporting part 116 and the left and right brackets 24, 26 via the pivot 27 that can be easily integrated by casting. A welded part around a pivot, as in a conventional frame, is not required. Thus, the number of parts can be reduced, the productivity of the body frame 11 can be enhanced, the body frame 11 can be lightened, and the cost can be reduced.

An embodiment of the invention includes the standing walls 131, 132 that extend rearwardly for covering the left and the right of the rear shock absorber unit 32. The standing walls 131, 132 are connected to the front frame 71 and more specifically to at least one of the rear portions of the main frame part 74 and the rear portion of the rear frame 23.

As the standing walls 131, 132 are provided to at least one of the rear portions of the main frame part 74 and the rear portion of the rear frame 23, the standing walls 131, 132 can be easily formed by casting without welding separate parts. Thus, the strength and the rigidity of the body frame 11 can be easily secured by the standing walls 131, 132.

An embodiment of the present invention includes recessed portions 126, 127 that open sideways with the pivot supporting part 116, the upper bracket mounting part 111 and the lower bracket mounting part 113, respectively, projecting sideways that can be integrated by casting the rear frame 23 in the mold which can be split sideways as shown in FIG. 4(c).

As the recessed portions 126, 127 open sideways, the pivot supporting part 116, the upper bracket mounting part 111 and the lower bracket mounting part 113, respectively, project sideways and are integrated in the mold which can be split sideways. The recessed portions 126, 127, the pivot supporting part 116, the upper bracket mounting part 111 and the lower bracket mounting part 113 can be easily formed.

In this embodiment, as shown in FIG. 6, the shock absorber upper part mounting parts 134, 135 for attaching the upper end 32a of the rear shock absorber unit 32 are provided to the rear of the rear frame 23. However, the invention is not limited to this and the shock absorber upper part mounting parts may be also be provided to the rear of the front frame 71.

The body frame according to an embodiment of the invention can be favorably applied to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame of a motorcycle comprising:
a head pipe provided to a front end;
a main frame extending rearwardly from the head pipe;
a pivot frame extending substantially downwardly from a rear of the main frame, the pivot frame having the same cross section as the main frame where the pivot frame joins the main frame,
the pivot frame having a left side and a right side, the distance between the left and right side defining the width of the pivot frame,
a pivot supporting part forming part of the pivot frame, the width of the pivot frame at the pivot supporting part being less than the width of the pivot frame above and below the pivot supporting part; and
a swing arm for supporting a rear wheel, said swing arm being attached to the left and right side of the pivot frame at the pivot supporting part so that the swing arm can be vertically swung.

2. The body frame of a motorcycle according to claim 1, wherein standing walls extending rearwardly for covering the right and the left of a shock absorber unit are provided to at least one of the rear of the main frame and the rear of the pivot frame.

3. The body frame of a motorcycle according to claim 1, wherein recessed portions open sideways, the pivot supporting part, an upper bracket mounting part and a lower bracket mounting part, respectively, project sideways and are integrated by casting the pivot frame in a mold which can be split sideways.

4. The body frame of a motorcycle according to claim 1, wherein said pivot frame includes an upper bracket mounting hole and a lower bracket mounting hole for accommodating mounting members for joining right and left brackets to the pivot frame.

5. The body frame of a motorcycle according to claim 4, wherein said upper bracket mounting hole and said lower bracket mounting hole for accommodating mounting members for joining the right and left brackets to the pivot frame extend a predetermined distance in a lateral direction of said body frame and said pivot supporting part extends in the lateral direction of said body frame a distance less than said predetermined distance of said upper bracket mounting hole and said lower bracket mounting hole.

6. The body frame of a motorcycle according to claim 4, and further including a left reinforcement wall for coupling a left upper mounting part forming the upper bracket mounting hole, a left pivot supporting part forming the pivot supporting part and a left lower mounting part forming the lower bracket mounting hole; and
a right reinforcement wall for coupling a right upper mounting part forming the upper bracket mounting hole, a right pivot supporting part forming the pivot supporting part and a right lower mounting part forming the lower bracket mounting hole.

7. The body frame of a motorcycle according to claim 1, wherein the swing arm includes a proximal end having a right arm and a left arm that are positioned on either side of said pivot supporting part with a pivot extending therebetween.

8. The body frame of a motorcycle according to claim 7, wherein said right arm and said left arm of said swing arm are positioned between a right bracket and a left bracket attached to the pivot frame.

9. The body frame of a motorcycle according to claim 1, wherein the swing arm has a right side connected to the pivot frame right side and a left side connected to the pivot frame left side, the distance between the swing arm right side and swing arm left side being greater than the width of the pivot frame at the pivot supporting part.

10. A body frame of a motorcycle comprising:
a head pipe disposed at a front end;

one main frame extending rearwardly from the head pipe;

a pivot frame extending substantially downwardly from a rear portion of the main frame, the pivot frame having the same cross section as the main frame where the pivot frame joins the main frame;

the pivot frame having a left side and a right side, a front wall, a back wall and a top wall, each connecting to and extending between the left and right side, the distance between the left and right side defining the width of the pivot frame;

the main frame connected to the pivot frame at the pivot frame top wall;

a pivot supporting part formed as a section of the pivot frame; and the pivot frame above and below the pivot supporting part being wider than the pivot supporting part.

11. The body frame of a motorcycle according to claim 10, wherein standing walls extending rearwardly for covering the right and the left of a shock absorber unit are mounted to at least one of the rear of the main frame and the rear of the pivot frame.

12. The body frame of a motorcycle according to claim 10, wherein recessed portions open sideways, the pivot supporting part, an upper bracket mounting part and a lower bracket mounting part, respectively, project sideways and are integrated by casting the pivot frame in a mold which can be split sideways.

13. The body frame of a motorcycle according to claim 10, wherein the main frame includes a predetermined cross-section at a distal end thereof and the pivot frame includes a corresponding predetermined cross-section at a proximal end thereof for mating with the predetermined cross-section of the distal end of the main frame for securing the main frame relative to the pivot frame.

14. The body frame of a motorcycle according to claim 13, wherein the predetermined cross-section at the distal end of the main frame and the predetermined cross-section at the proximal end of the pivot frame are square with one of the distal end of the main frame and the proximal end of the pivot frame being accommodated within the other for securing the main frame relative to the pivot frame.

15. The body frame of a motorcycle according to claim 10, wherein said pivot frame includes an upper bracket mounting hole and a lower bracket mounting hole for accommodating mounting members for joining right and left brackets to the pivot frame.

16. The body frame of a motorcycle according to claim 15, wherein said upper bracket mounting hole and said lower bracket mounting hole for accommodating mounting members for joining the right and left brackets to the pivot frame extend a predetermined distance in a lateral direction of said body frame and said pivot supporting part extends in the lateral direction of said body frame a distance less than said predetermined distance of said upper bracket mounting hole and said lower bracket mounting hole.

17. The body frame of a motorcycle according to claim 15, and further including a left reinforcement wall for coupling a left upper mounting part forming the upper bracket mounting hole, a left pivot supporting part forming the pivot supporting part and a left lower mounting part forming the lower bracket mounting hole; and a right reinforcement wall for coupling a right upper mounting part forming the upper bracket mounting hole, a right pivot supporting part forming the pivot supporting part and a right lower mounting part forming the lower bracket mounting hole.

18. The body frame of a motorcycle according to claim 10, further comprising a swing arm attached to the pivot supporting part, the swing arm including a proximal end having a right arm and a left arm that are positioned on either side of said pivot supporting part with a pivot extending therebetween.

19. The body frame of a motorcycle according to claim 18, wherein said right arm and said left arm of said swing arm are positioned between the right bracket and the left bracket attached to the pivot frame.

20. A body frame of a motorcycle comprising:
a head pipe provided to a front end;
a main frame extending rearwardly from the head pipe;
a pivot frame connected to the main frame at a single point, the pivot frame having the same cross section as the main frame where the pivot frame joins the main frame;
the pivot frame having a left side and a right side, a front and back wall connecting to and extending between the left and right side, the distance between the left and right side defining the width of the pivot frame;
a pivot supporting part provided on the pivot frame;
a swing arm for supporting a rear wheel, said swing arm being attached to the pivot supporting part so that the swing arm can be vertically swung; and
the pivot frame above and below the pivot supporting part being wider than the pivot supporting part.

* * * * *